United States Patent Office.

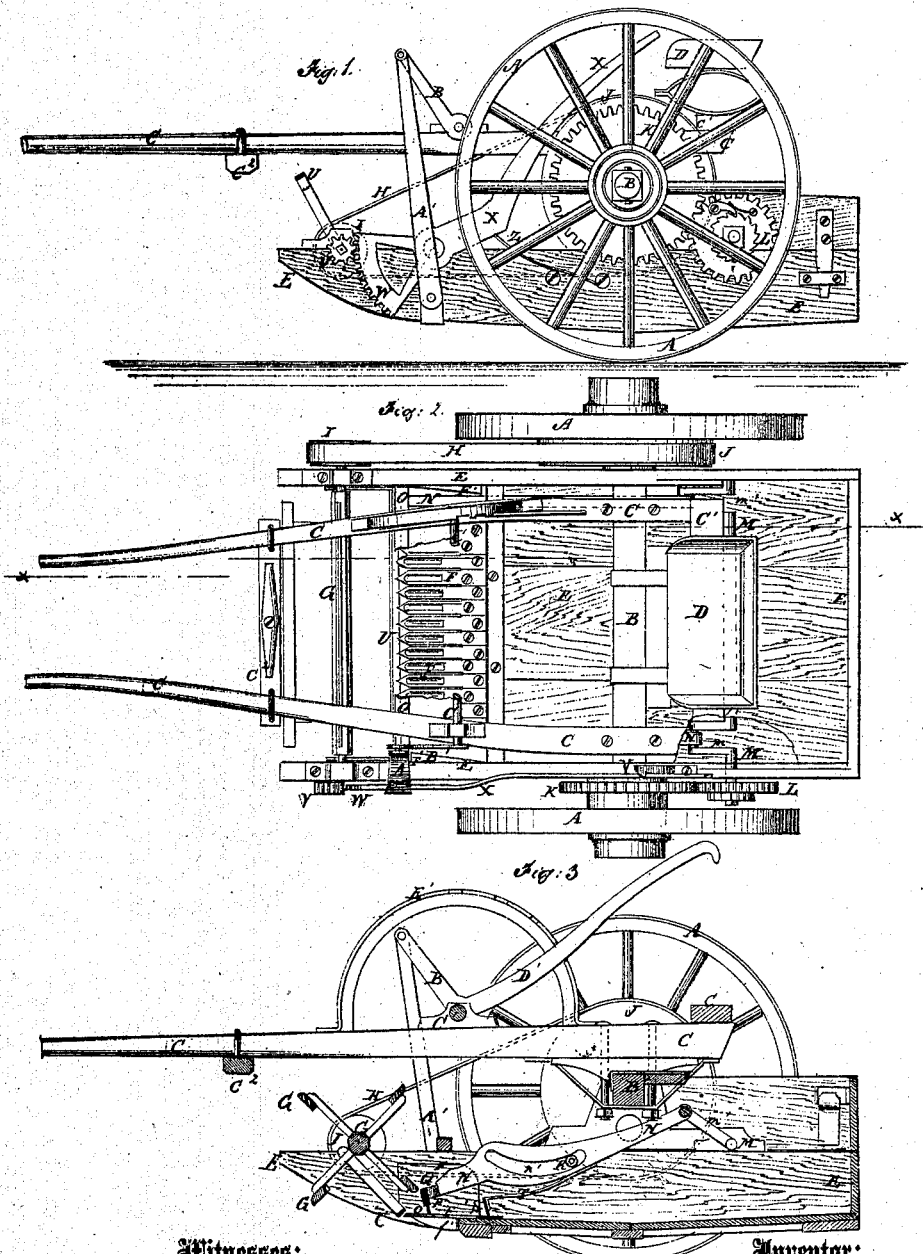

MAJOR JOSEPH W. STIVERS, OF NORTH MIDDLETOWN, KENTUCKY.

Letters Patent No. 104,508, dated June 21, 1870.

IMPROVEMENT IN SEED-STRIPPERS.

The Schedule referred to in these Letters Patent and making part of the same

*To all whom it may concern:*

Be it known that I, MAJOR JOSEPH W. STIVERS, of North Middletown, in the county of Bourbon and State of Kentucky, have invented a new and useful Improvement in Machine for Stripping Blue-grass Seed; and I do hereby declare that the following is a full, clear, and exact description thereof, which will enable others skilled in the art to make and use the same, reference being had to the accompanying drawing forming part of this specification, in which—

Figure 1 is a side view of my improved machine.

Figure is a top view of the same, parts being broken away to show the construction.

Figure 3 is a detail vertical longitudinal section of the same, taken through the line $x\ x$, fig. 2.

My invention has for its object to furnish a simple, convenient, and effective machine for stripping the seed from blue-grass, while standing in the field; and It consists in the construction and combination of the various parts of the machine, as hereinafter more fully described.

A are the drive-wheels, which are connected with and revolve upon the axles of the axle-tree B in the ordinary manner.

C are the thills, the rear parts of which are secured to the axle-tree B, and the rear ends of which are connected by a cross-bar, $c^1$, that supports the driver's seat D. The thills C, a little in front of the forward edge of the machine, are connected by a cross-bar, $c^2$, to which the whiffletree is pivoted.

E is the box or body of the machine, which is hung from bearings or journals formed upon the axle-tree B by means of brackets or bearings attached to the said body or box E, said brackets having second holes formed through them at a lower level than the ordinary holes, to receive the journals of the axle-tree B, to raise the said body away from the ground when passing from place to place.

F are the stripping-teeth, the rear ends or bases of which are securely bolted to a beam, which is securely, but detachably, bolted to the forward edge of the body or box E, so that it may be conveniently detached from the machine when required, for convenience in repairing the teeth F.

The teeth F are concaved upon their upper sides, and are so formed as to leave narrow spaces or openings between the adjacent side edges of said teeth, which allow the fine stalks of the blue-grass to pass through, but will strip off the seed.

To give the teeth F sufficient strength to strip off the seed, the said teeth are strengthened by a flange or rib, $f'$, formed upon or attached to their lower sides, as shown in fig. 3.

The grass is forced against the teeth F, as the machine is drawn forward, by the reel G, which is made somewhat similar to the reel of a harvester, and the journals of which revolve in bearings attached to the forward ends of the side boards of the body or box E.

The reel G is revolved, as the machine is drawn forward, by the band H, which passes around the pulley I attached to the projecting end of the reel-shaft, and around the pulley J attached to one of the drive-wheels A. With the other drive-wheel A is rigidly connected a gear-wheel, K, into the teeth of which mesh the teeth of the gear-wheel L, which runs loosely upon the projecting end of the crank-shaft M, and which is connected with said crank-shaft M by a spring-pawl and ratchet-wheel in such a way as to carry the said crank-shaft with it when the machine is drawn forward, and to allow the said crank-shaft to stand still when the machine is moved backward.

The shaft M revolves in bearings attached to the side boards of the box or body E, and upon it, just inside of the said side boards are formed two cranks $m'$, to which are pivoted the rear ends of the connecting-bars N, which extend along the inner sides of the box or body E, and the forward ends of which are connected by a cross-bar, O, which is adjustably attached to them, so that it may be conveniently raised and lowered, as required.

To the forward side of the bar O is attached a metallic plate or knife, P, which is drawn back along the upper surfaces of the teeth F, to draw the seed back into the body or box E, as it is stripped from the blue grass by the said teeth F.

To the forward side of the plate P is attached a rubber plate, Q, for the purpose of cleaning off the said teeth F.

In the connecting-bars N, near their forward ends, are formed curved slots $n'$, through which pass pins R, provided with friction-rollers, and securely attached to the side boards of the box or body E, to serve as pivots or fulcrums for the said bars N, so that, as the rear ends of the bars N are carried downward and forward by the action of the cranks $m'$, the forward ends of the said bars and the attached scraper and rubber may be carried upward and forward, to pass over the seed upon the teeth F.

As the rear ends of the bars N are carried upward and backward by the cranks $m'$, the scraper P and rubber Q will be drawn back along the teeth F, drawing the seed back into the box or body E.

The scraper P and rubber Q are made to move in a slightly diagonal direction, as they are drawn back, by the inclined blocks F' attached to the inner sides of the forward parts of the side boards of the body or box E, and against which the ends of the bar O rest.

S is a bar or plate connected with the middle parts of the bars N by springs T, which hold the said plate S down upon the bottom of the box or body E, so as to take the seed where it is left by the scraper P and draw it further back into the body or box E.

U is a guard-bar, the ends of which work in bearings in the forward parts of the side boards of the body E, and which is bent twice at right angles near its ends, to pass over the reel G, so that it may be turned down against the points of the teeth F, to prevent the said teeth from operating when the machine is passing through patches of weeds, clover, or other vegetation that would foul the seed or clog the machine.

To one end of the guard-bar U is attached a small gear-wheel, V, into the teeth of which mesh the teeth of the segmental gear-wheel W, formed upon or attached to the end of the lever X, which is pivoted to the side boards of the body or box E, and the other end of which extends up into such a position that it may be reached and operated by the driver from his seat.

Y is a catch, secured in such a position that it may catch upon and hold the said lever when moved downward to hold the guard-bar U against the ends of the teeth F.

Z is a spring attached to the body or box E, and the free end of which rests against the under side of the rear part of the lever X, so that, when the said lever is released from the catch Y, the said spring may operate the said lever to raise the said guard-bar U away from the teeth F.

A' are two connecting-bars, placed one upon each side of the machine, and the lower ends of which are pivoted to the forward parts of the said boards of the box or body E, and the upper ends of which are pivoted to the forward ends of the arms B', the rear ends of which are rigidly attached to the ends of the shaft C', which works in bearings attached to the thills O.

To one end of the shaft C', or to one of the arms B', is attached, or upon it is formed, a lever, D', the free end of which extends into such a position that it may be reached and operated by the driver from his seat D.

E' is a curved notched or toothed bar, along which the lever D' moves, so that the said lever may be held securely in any position into which it may be adjusted. This enables the forward end of the machine to be adjusted at any desired height, according to the length of the grass to be stripped, without interfering with the proper operation of the various parts of the machine.

Having thus described my invention,

I claim as new and desire to secure by Letters Patent—

1. A connecting crank-bar N, having the curved slot n', combined with a fixed guide-pin R, to carry the scraper and cleaner over the seed in its forward movement, as set forth.

2. The combination of concave strippers F, scraper P, connecting-bars N, and spring plate S T, by whose co-operating instrumentality the seed is stripped and delivered to the receiving-box.

3. The vibrating guard-bar U, pivoted as described, bent at right angles to its length on each end, and brought in front of the teeth, to prevent them from stripping weeds and other grasses of their seeds.

4. The combination of rack and pinion V W, catch Y, guard U, fingers F, and body E, all constructed and relatively arranged as and for the purpose specified.

MAJOR JOSEPH W. STIVERS.

Witnesses:
JAMES SCOTT,
W. P. SCHOOLER.